UNITED STATES PATENT OFFICE.

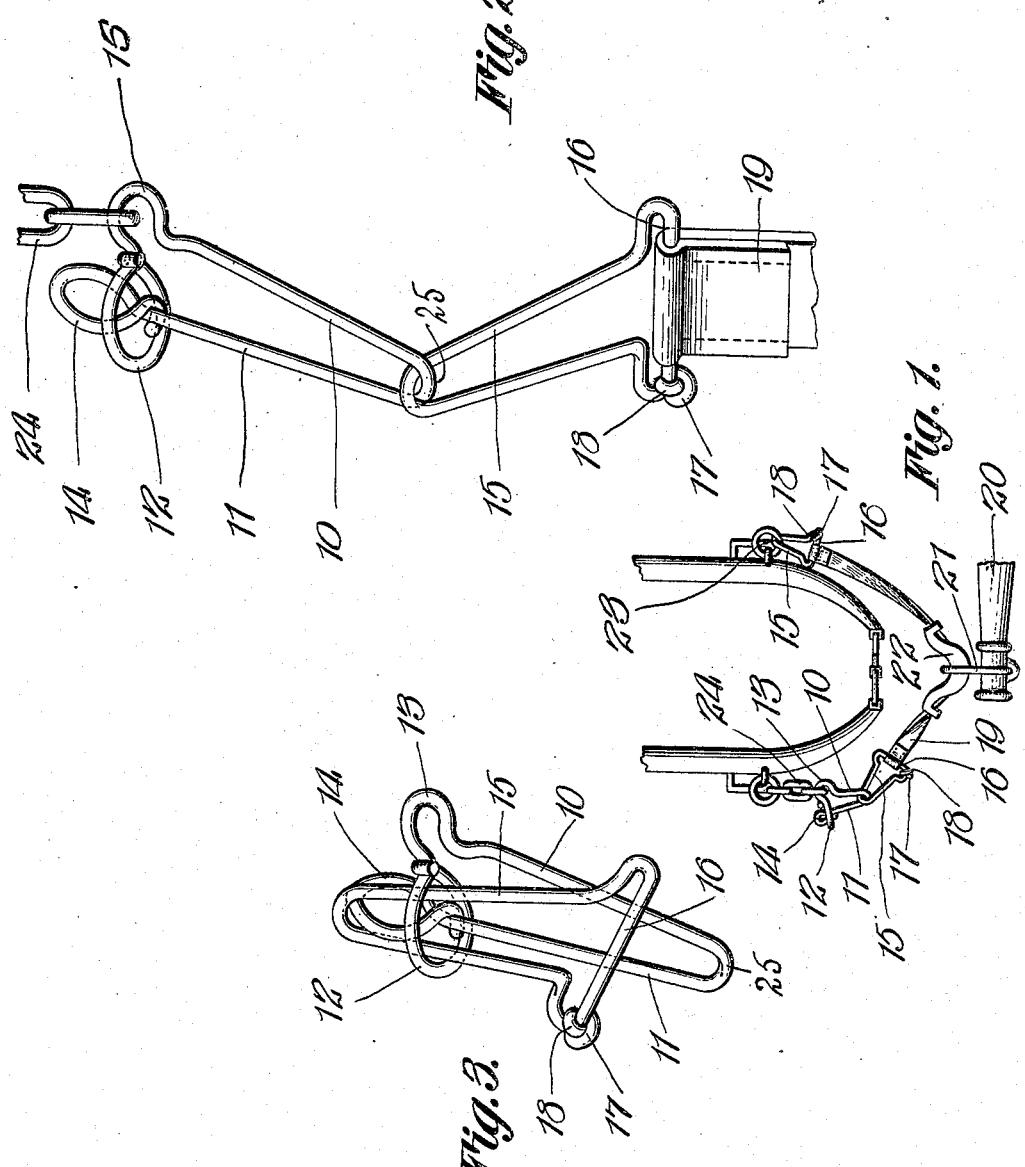

WENCEL SEDLACEK, OF ORD, NEBRASKA.

BREAST-STRAP SNAP.

942,289.      Specification of Letters Patent.      Patented Dec. 7, 1909.

Application filed October 26, 1908. Serial No. 459,622.

*To all whom it may concern:*

Be it known that I, WENCEL SEDLACEK, a citizen of the United States, residing at Ord, in the county of Valley, State of Nebraska, have invented certain new and useful Improvements in Breast-Strap Snaps; and I do hereby declare the following to be a full, clear, and exact description of the invention, such as will enable others skilled in the art to which it appertains to make and use the same.

This invention relates to fastening devices, more particularly to devices for detachably coupling neck yoke straps to the hames of horse collars and commonly known as " breast snaps," and has for one of its objects to provide a simply constructed device of this character which may be readily coupled or uncoupled and the parts remain attached to the eyes at the ends of the connected members.

Another object of the invention is to provide a simply constructed device of this character which may be inexpensively manufactured from wire and presents no obstructions or projections when in use to be engaged by the reins or other portions of the harness.

With these and other objects in view, the invention consists in a body having spaced arms with an eye at one end of one of the arms extended at right angles thereto and transversely thereof and the terminal of the other arm extending through the eye, and a loop passing through the eye and around the extended terminal, the body and the loop being coupled respectively to the hames and to the neck yoke strap.

The invention further consists in certain novel features of construction as hereafter shown and described and then specifically pointed out in the claims, and in the drawings illustrative of the preferred embodiment of the invention, Figure 1 is a view of the lower portions of a pair of hames and a portion of a neck yoke and a yoke strap, with the improvement applied. Fig. 2 is a perspective view, enlarged, of the improved device in coupled position. Fig. 3 is a perspective view, enlarged, with the lower portion showing the relative position of the parts when the lower part is being coupled with the body member.

The improved device may be employed for coupling various articles or bodies together but is more particularly adapted for detachably coupling the neck yoke strap to the hames of harnesses, and for the purpose of illustration is shown thus applied, but it will be understood that it is not desired to limit the invention in any manner to the purposes for which it may be employed.

The improved device is constructed of wire in two portions, a body portion adapted to be coupled to one of the hame members, and a loop portion adapted to be coupled to the neck yoke strap. Each of the members is preferably constructed from a single piece of wire, the body portion being formed with two arms 10—11 spaced apart with an eye 12 formed in the terminal of one arm and arranged at right angles to the arm and likewise transversely thereof, and with a loop 13 between the eye 12 and the arm 10. The other arm 11 is arranged with its terminal extending through the eye 12, this terminal preferably formed with an eye 14 arranged at right angles to the eye 12 as shown.

The loop portion of the device is formed with a link portion 15 and an elongated loop 16 at one end of the link, the terminals of the piece of wire which forms the loop member being connected by interlocking eyes 17—18 formed therein as shown. The loop 16 is designed to be engaged by the neck yoke strap 19, as shown. A portion of a conventional neck yoke is shown at 20 having a ring 21 with the wear member 22 carried by the strap 19 and engaged by the ring. One end of the strap 19 is coupled permanently to one hame as at 23 and the other end carries the improved snap device.

With a device thus constructed the operation is as follows. The body member 10 being coupled by its loop 13 to one of the hame members by a section of chain 24, and the loop 15 coupled by its link 16 to the yoke strap 19, the link portion 15 of the loop member is passed through the eye 12 of the arm 10 from the inner side and thence around the free end of the eye 14 and thence back again around the eye 12 and engaged with the bent terminal 25 which unites the arms 10—11, as shown in Fig. 1. By this means the body member and the loop member are effectually coupled and while permitting a large degree of free movement and flexibility, the members will not become disconnected no matter how vigorously the parts may be shaken about.

The wire employed for constructing the device will be of sufficient strength to withstand the severe strains to which devices of this character are subjected when in use, and may be plated, galvanized, japanned or otherwise treated in the same manner as the other metal portions of the harness. The improved device will thus be capable of employment in the same manner as the other fastening devices whereby the hame members of the harness are united to the neck yoke strap, and while possessing all of the advantages of devices of this character as heretofore constructed, possesses many advantages not possessed by such articles, such for instance as lightness combined with great strength and durability, flexibility which will permit severe strains to be applied without fracturing the parts, cheapness of construction, and the like.

The improved devices while particularly adapted for use in connection with the hames and neck yoke straps of harnesses may be likewise employed for other purposes without structural change or modification.

What is claimed, is:—

1. A device of the class described comprising a body having two spaced arms rigidly united with eyes at their ends, one of said eyes arranged at right angles to the arm of which it forms a part and transversely thereof and with the other eye extending through the same, an elongated loop adapted to be engaged in said body by passing the same through the right angled eye and around the other eye, said body adapted to be coupled to one structure and said loop member adapted to be coupled to another structure.

2. A device of the class described comprising a body having two spaced arms rigidly united with an eye at one end, said eye arranged at right angles to the arm of which it forms a part and transversely thereof with the terminal of the other arm extending through said eye, a loop adapted to be engaged in said body by passing the same through said eye and around the extended arm terminal.

3. A device of the class described comprising a body having two spaced arms rigidly united with an eye at one end of one arm, said eye arranged at right angles to said arm and transversely thereto with the terminal of said other arm extending through said eye, and a lateral loop in the arm having the eye and adjacent to said eye.

4. A device of the class described comprising a body formed from a single piece of wire having an eye in one end bent at right angles thereto and the body bent intermediate its ends into a substantially U shape with the free end of the body extending through the eye, and an elongated loop adapted to be engaged in said body by passing the same through the right angled eye and around the terminal of the body extending therethrough.

5. A device of the class described comprising a body formed from a single piece of wire having an eye in one end bent at right angles thereto and with a lateral loop next to the eye and the body bent intermediate its ends into a substantially U shape with the free end of the body extending through the eye, and an elongated loop adapted to be engaged in said body by passing the same through the right angled eye and around the terminal of the body extending therethrough.

In testimony whereof, I affix my signature, in presence of two witnesses.

WENCEL SEDLACEK.

Witnesses:
JASPER VANSLYKE,
JOE BARTA.